United States Patent
Moscatelli et al.

(10) Patent No.: US 10,418,159 B2
(45) Date of Patent: Sep. 17, 2019

(54) AMPHIPHILIC MAGNETIC NANOPARTICLES AND AGGREGATES TO REMOVE HYDROCARBONS AND METAL IONS AND SYNTHESIS THEREOF

(71) Applicant: Politecnico di Milano, Milan (IT)

(72) Inventors: Davide Moscatelli, Arese (IT); Maurizio Masi, Milan (IT); Ruggiero Maria Pesce, Milan (IT)

(73) Assignee: POLITECNICO DI MILANO, Milan (IT)

( * ) Notice: Subject to any disclaimer, the term of this patent is extended or adjusted under 35 U.S.C. 154(b) by 56 days.

(21) Appl. No.: 15/312,194

(22) PCT Filed: May 18, 2015

(86) PCT No.: PCT/IB2015/053652
§ 371 (c)(1),
(2) Date: Nov. 18, 2016

(87) PCT Pub. No.: WO2015/177710
PCT Pub. Date: Nov. 26, 2015

(65) Prior Publication Data
US 2017/0092396 A1 Mar. 30, 2017

(30) Foreign Application Priority Data
May 20, 2014 (IT) .............................. MI2014A0913

(51) Int. Cl.
*H01F 1/00* (2006.01)
*B01J 20/06* (2006.01)
(Continued)

(52) U.S. Cl.
CPC ............ *H01F 1/0054* (2013.01); *B01J 20/06* (2013.01); *B01J 20/223* (2013.01);
(Continued)

(58) Field of Classification Search
CPC .... B01J 20/06; B01J 20/223; B01J 20/28009; B01J 20/28016; B01J 20/3204;
(Continued)

(56) References Cited

U.S. PATENT DOCUMENTS

| 2006/0057211 A1 | 3/2006 | Chorny et al. |
| 2008/0089836 A1* | 4/2008 | Hainfeld ............ A61K 49/0428 |
| | | 424/1.11 |

(Continued)

FOREIGN PATENT DOCUMENTS

| WO | 2008030862 A2 | 3/2008 |
| WO | 2009151490 A2 | 12/2009 |
| WO | 2013192629 A1 | 12/2013 |

OTHER PUBLICATIONS

Search Report of PCT/IB2015/053652 dated Sep. 23, 2015.
Written Opinion of PCT/IB2015/053652 dated Sep. 23, 2015.

*Primary Examiner* — Dirk R Bass
(74) *Attorney, Agent, or Firm* — Silvia Salvadori, P.C.; Silvia Salvadori (57) ABSTRACT

The present invention relates to a magnetic nanoparticle comprising: a) a core containing a ferromagnetic material; b) an outer coating containing a mixture of a lipophilic compound and a hydrophilic compound. The outer coating of the above particle makes the nanoparticle stable in water and, simultaneously, capable of adsorbing/emulsifying large amounts of hydrophobic/lipophilic compounds. The present invention further relates to a process for the preparation of the above-mentioned particles as well as their use in the removal of hydrocarbons from solid or liquid environments and metal ions from contaminated water (wastewater).

23 Claims, 7 Drawing Sheets

(51) Int. Cl.
*B01J 20/22* (2006.01)
*C02F 1/48* (2006.01)
*B01J 20/32* (2006.01)
*C09K 3/32* (2006.01)
*B03C 1/015* (2006.01)
*C02F 1/28* (2006.01)
*H01F 1/03* (2006.01)
*B01J 20/28* (2006.01)
*B03C 1/28* (2006.01)
*C02F 101/10* (2006.01)
*C02F 101/14* (2006.01)
*C02F 101/20* (2006.01)
*C02F 101/22* (2006.01)
*C02F 101/32* (2006.01)

(52) U.S. Cl.
CPC ... *B01J 20/28009* (2013.01); *B01J 20/28016* (2013.01); *B01J 20/3204* (2013.01); *B01J 20/3231* (2013.01); *B01J 20/3293* (2013.01); *B03C 1/015* (2013.01); *B03C 1/288* (2013.01); *C02F 1/288* (2013.01); *C02F 1/48* (2013.01); *C09K 3/32* (2013.01); *H01F 1/0306* (2013.01); *C02F 2101/103* (2013.01); *C02F 2101/14* (2013.01); *C02F 2101/203* (2013.01); *C02F 2101/206* (2013.01); *C02F 2101/22* (2013.01); *C02F 2101/32* (2013.01); *C02F 2305/08* (2013.01)

(58) Field of Classification Search
CPC ... B01J 20/3231; B01J 20/3293; B03C 1/015; C02F 1/288; C02F 1/48; C02F 2101/103; C02F 2101/14; C02F 2101/203; C02F 2101/206; C02F 2101/22
See application file for complete search history.

(56) References Cited

U.S. PATENT DOCUMENTS

| | | |
|---|---|---|
| 2010/0330704 A1 | 12/2010 | Nakahama et al. |
| 2012/0037840 A1* | 2/2012 | Stucky ............ B01D 15/00 252/62.53 |
| 2013/0045160 A1 | 2/2013 | Ham et al. |

* cited by examiner

FIGURE 2 (continuation)

FIGURE 2 (continuation)

AMPHIPHILIC MAGNETIC NANOPARTICLES AND AGGREGATES TO REMOVE HYDROCARBONS AND METAL IONS AND SYNTHESIS THEREOF

This application is a U.S. national stage of PCT/IB2015/053652 filed on 18 May 2015 which claims priority to and the benefit of Italian Application No. MI2014A000913 filed on 20 May 2014, the content of which are incorporated herein by reference in their entireties.

The present invention relates to a magnetic nanoparticle comprising:
  a) a core containing a ferromagnetic material;
  b) an outer coating containing a mixture of a lipophilic compound and a hydrophilic compound.

The outer coating of the above particle makes the nanoparticle stable in water and, simultaneously, capable of adsorbing/emulsifying large amounts of hydrophobic/lipophilic compounds.

The present invention further relates to a process for the preparation of the above-mentioned particles as well as their use in the removal of hydrocarbons from solid or liquid environments and metal ions from contaminated water (wastewater).

STATE OF THE ART

In recent years, the magnetic nanoparticles have attracted significant interest from the scientific community for their versatility in being able to be used in various research fields, such as catalysis, bio-medicine, magnetic resonance imaging, data storage, and environmental remediation.

Several different materials have been used for the realization of magnetic nanoparticles, especially those containing iron, cobalt or nickel dispersed in non-conductive liquids. By way of example, iron oxides such as magnetite ($Fe_3O_4$, also referred to as FeO x $Fe_2O_3$), maghemite ($\gamma$-$Fe_2O_3$), barium ferrite ($BaFe_2O_4$), or cobalt ferrite ($CoFe_2O_4$) may be mentioned.

In order to improve the stability of the above-mentioned magnetic nanoparticles and prevent their agglomeration, such nanoparticles are traditionally coated with an organic compound, such as an organic monomer or polymer, or an inorganic compound, such as a metal or oxide.

To date, organic polymers are the class of coatings most widely used to increase the stability of magnetic nanoparticles. Among these, dextran, carboxymethyl dextran, polyvinyl alcohol, chitosan, starch, polyethylene glycol (PEG), and poly (lactic-co-glycolic) acid (PLGA) may be mentioned.

As mentioned above, an important goal to reach is the stabilization of the magnetic nanoparticles in the desired solvent to prevent their aggregation and precipitation.

Therefore, if liposoluble magnetic nanoparticles are to be obtained, oleic acid is generally used to functionalize the surface of the nanoparticles (Bica D. et al. Journal of Magnetism and Magnetic Materials 2007, 311, 17-21; Lan Q. et al. Journal of Colloid and Interface Science 2007, 310, 260-269; Ingram D. R. et al. Journal of Colloid and Interface Science 2010, 351, 225-232).

Alternatively, the most widely used method to obtain amphiphilic magnetic nanoparticles, after functionalizing the surface with lipophilic compounds such as oleic acid, involves adsorbing a polar surfactant such as sodium dodecyl sulfate (SDS) on the nanoparticles surface, at a later time (Zheng W. et al. Journal of Magnetism and Magnetic Materials 2005, 288, 403-410). SDS places the lipophilic tail in contact with the oleic acid tails, and the polar head in contact with the water, thus ensuring the stability of the nanoparticles in water.

The above-mentioned coated magnetic nanoparticles may be used as adsorbents for solid phase extraction to extract polycyclic aromatic hydrocarbons (Journal of Chromatography A, 2010, 29, 4757-4764).

However, although the coating containing, for example, oleic acid and SDS favors the stability of magnetic nanoparticles in water, the polar surfactant tends to desorb in case of an increase in temperature.

-continued

AQUEOUS ENVIRONMENT

The need is therefore felt for a coating that allows to prepare more stable magnetic nanoparticles, with a simple process.

DESCRIPTION

It has now surprisingly been found that a nanoparticle of a ferromagnetic material coated with a mixture of a lipophilic compound and a hydrophilic compound, is particularly stable, thanks to the formation of a covalent bond between the surface of the magnetite and the outer coating.

Therefore, the object of the present invention is a magnetic nanoparticle comprising:
c) a core containing a ferromagnetic material;
d) an outer coating containing a mixture of at least a lipophilic compound and at least a hydrophilic compound.

Preferably, said nanoparticle consists of:
a) a core consisting of a ferromagnetic material;
b) an outer coating containing a mixture of at least a lipophilic compound and at least a hydrophilic compound.

According to the present invention, the term "nanoparticle" refers to a particle with particle size ranging between 1 nm and 200 nm.

The term "ferromagnetic material" means a material having the property of becoming magnetized under the action of an external magnetic field, and remaining long magnetized when the field is canceled.

According to the present invention, a ferromagnetic material may be selected from magnetite, maghemite, barium ferrite, cobalt ferrite, nickel ferrite, manganese ferrite, strontium ferrite, or zinc ferrite.

Preferably, said ferromagnetic material is magnetite.

According to one embodiment, the lipophilic compound of the present invention is a fatty acid. A suitable fatty acid according to the present invention preferably contains from 4 to 24 carbon atoms; said fatty acid may be saturated or unsaturated.

More preferably, said fatty acid is selected from palmitoleic acid, oleic acid, erucic acid, linoleic acid, linolenic acid, arachidonic acid, and ricinoleic acid.

According to a particularly preferred embodiment of the present invention, said fatty acid is oleic acid.

According to an embodiment of the present invention, the hydrophilic compound is selected from a hydrophilic carboxylic acid and a salt of a fatty acid containing a sulfonate group.

Preferably, said hydrophilic carboxylic acid is selected from methacrylic acid or a polymer thereof, acrylic acid or a polymer thereof, citric acid, adipic acid, malic acid, ascorbic acid, oxalic acid, malonic acid, succinic acid, and fumaric acid; more preferably it is citric acid, or a polymer of acrylic acid with low molecular weight.

According to the present invention, the term "salt of a fatty acid containing a sulfonate group" refers to an unsaturated fatty acid that is sulfonated and subsequently salified with a suitable alkaline metal or alkaline earth metal, thus bearing a —$HSO_3$ group salified with a suitable alkaline metal or alkaline earth metal.

Examples of suitable alkaline metals according to the present invention are selected from sodium or potassium, while suitable alkaline earth metals are selected from calcium and magnesium.

Preferably said salt of a fatty acid is selected from a sodium salt or a potassium salt of one of the following compounds: sulfonated palmitoleic acid, sulfonated oleic acid, sulfonated erucic acid, sulfonated linoleic acid, sulfonated linolenic acid, sulfonated arachidonic acid, and sulfonated ricinoleic acid.

Alternatively, said salt of a fatty acid may be a calcium or magnesium salt of one of the following compounds: sulfonated palmitoleic acid, sulfonated oleic acid, sulfonated erucic acid, sulfonated linoleic acid, sulfonated linolenic acid, sulfonated arachidonic acid, and sulfonated ricinoleic acid.

According to a particularly preferred embodiment of the present invention, said salt of a fatty acid is a sodium salt of sulfonated oleic acid.

By way of example, a synthetic method used to prepare the said sodium oleate sulfonate is reported below (Scheme 1).

As will be clear to the person skilled in the art, this synthetic method may also be applied to the preparation of one of the other fatty acid salts mentioned above.

According to a preferred embodiment of the present invention, the concentration of the solution of sulfonating agent dissolved in the above-mentioned polar solvent is comprised between 10 mg/mL and 60 mg/mL, more preferably it is of about 25 mg/mL. Preferably, said fatty acid and said sulfonating agent are present in the above-mentioned mixture in a molar ratio comprised between 1:0.1 and 1:10, more preferably of about 1:1.

Once the fatty acid is functionalized with a sulfonate group, the solution is preferably concentrated up to about one third of the initial volume, and an inorganic base is added to salify the reaction product.

According to a preferred aspect of the present invention, said inorganic base may be an alkaline or alkaline earth metal hydroxide, an alkaline or alkaline earth metal carbonate, or an alkaline or alkaline earth metal bicarbonate.

Preferably, said inorganic base is an alkaline metal bicarbonate, selected from sodium bicarbonate and potassium bicarbonate, more preferably it is sodium bicarbonate.

Said fatty acid and said inorganic base are present in the reaction mixture in a molar ratio comprised between 1:1 and 1:10, more preferably of about 1:3.

Scheme 1

The salt of a fatty acid containing a sulfonate group according to the present invention is then prepared according to methods well known to the expert in the field.

Preferably, the fatty acid is dissolved in an apolar solvent, selected from ethyl ether, acetone, dichloromethane, chloroform, tetrahydrofuran, dioxane, hexane, more preferably in tetrahydrofuran.

According to a preferred embodiment of the present invention, the concentration of the solution of fatty acid dissolved in the above polar solvent is comprised between 30 mg/mL and 150 mg/mL, more preferably it is of about 70 mg/mL.

According to a further aspect of the present invention, a second solution containing a sulfonating agent and an apolar solvent is prepared and added dropwise to the solution containing the fatty acid, to provide a mixture which is allowed to react at room temperature.

Said sulfonating agent is preferably selected from sulfuric acid, oleum, chlorosulfonic acid and aminosulfuric acid, more preferably it is chlorosulfonic acid.

Said apolar solvent is preferably selected from ethyl ether, acetone, dichloromethane, chloroform, tetrahydrofuran, dioxane, hexane, more preferably it is tetrahydrofuran.

The salt of a fatty acid containing a sulfonate group thus obtained is recovered, filtered and washed with an apolar solvent, preferably with diethyl ether.

According to the present invention, said lipophilic compound and said hydrophilic compound are present in the outer coating of the nanoparticle in a molar ratio comprised between 1:0.1 and 1:10, preferably between 1:0.8 and 1:1.5, more preferably said molar ratio is of about 1:1.

According to the present invention, said lipophilic compound is present in the coated nanoparticle in an amount by weight comprised between 1% and 100% by weight, preferably between 10% and 40% by weight, more preferably of about 28% by weight, with respect to the total weight of the coated nanoparticle.

In other words, said fatty acid is present in the coated nanoparticle in an amount by weight comprised between 0.01 $g/g_{particle}$ and 1 $g/g_{particle}$, preferably between 0.1 $g/g_{particle}$ and 0.4 $g/g_{particle}$, more preferably of about 0.28 $g/g_{particle}$.

According to the present invention, said hydrophilic compound is present in the coated nanoparticle in an amount by weight comprised between 1% and 100% by weight, preferably between 10% and 40% by weight, more preferably of about 31% by weight, with respect to the total weight of the coated nanoparticle.

In other words, said hydrophilic compound is present in the coated nanoparticle in an amount by weight comprised between 0.01 $g/g_{particle}$ and 1 $g/g_{particle}$, preferably between 0.1 $g/g_{particle}$ and 0.4 $g/g_{particle}$, more preferably of about 0.31 $g/g_{particle}$.

A further object of the present invention is a process for the preparation of magnetic nanoparticles, comprising the co-precipitation of an aqueous solution of $Fe^{2+}$ and $Fe^{3+}$ salts and a solution containing a lipophilic compound and a hydrophilic compound.

For this purpose, an aqueous solution containing a Fe(II) salt and a Fe(III) salt is prepared, wherein said Fe(II) salt and said Fe(III) salt are present in a molar ratio ranging between 1:1 and 1:3, preferably said molar ratio is of about 1:2.

Said aqueous solution is preferably brought to a temperature comprised between room temperature and 120° C., more preferably at 80° C., and maintained under stirring for a period of time ranging between 10 minutes and 1 hour, preferably for 30 minutes.

According to one aspect of the present invention, the hydrophilic compound is dissolved in a polar solvent, preferably in water.

Preferably, said hydrophilic compound is present in the solution thus obtained in an amount by weight comprised between 0.05 $g/g_{solvent}$ and 0.5 $g/g_{solvent}$, more preferably of about 0.11 $g/g_{solvent}$.

According to a further object of the present invention, a second solution containing a lipophilic compound, a base, and a polar solvent is prepared.

Preferably, said lipophilic compound is present in the solution thus obtained in an amount by weight comprised between 50 mg and 200 mg, more preferably of about 85 mg, with respect to the total weight of the solution.

Said base is preferably an organic base selected from ammonia, monoethanolamine (MEA), diethanolamine (DEA), triethylamine (TEA), diisopropylethylamine (DIPEA), more preferably it is ammonia.

A polar solvent suitable for preparing the above-mentioned solution is selected from acetone, dimethylformamide, tetrahydrofuran, acetonitrile, preferably it is acetone.

According to a preferred embodiment, said lipophilic compound and said base are present in a molar ratio comprised between 1:10 and 1:50, most preferably of about 1:22.

More preferably, the concentration of the solution of lipophilic compound dissolved in the above-mentioned polar solvent is comprised between 0.15 g/mL and 1.5 g/mL, still more preferably it is of about 0.65 g/mL.

Subsequently, the aqueous solution containing the hydrophilic compound and the aqueous solution containing the lipophilic compound are added to the above aqueous solution containing the iron salts, and it is allowed to react for a period of time comprised between 10 minutes and 1 hour, preferably for 30 minutes.

According to a preferred embodiment of the present invention, said lipophilic compound and said hydrophilic compound are present in the above-mentioned solution in a molar ratio comprised between 1:0.1 and 1:10, more preferably of about 1:1.

The nanoparticles thus obtained are washed with a polar solvent selected from dimethylformamide, dimethylsulfoxide, methanol, ethanol, acetone, acetic acid, preferably with acetone. They are recovered and washed several times with the above-mentioned polar solvent.

The solvent used for washing is removed, and the nanoparticles of the invention are dispersed in water.

The simultaneous presence of the lipophilic compound and the hydrophilic compound during the reaction makes sure the nanoparticles according to the invention are covered as soon as they are formed. The bond created between the surface of the ferromagnetic material and the acid or the sulfonate of the hydrophilic compound is of a covalent type. In fact, for example, the carboxyl group and the sodium salt of the carboxyl group lose a proton; the carboxylate ion that is formed has a negative charge delocalized between the two oxygens to form a structure in resonance, as reported below (Scheme 2):

Scheme 2

The anion thus formed binds covalently to the surface of the nanoparticles, forming a protective layer which acts as an outer coating:

Therefore, the process of the present invention leads to the preparation of magnetic nanoparticles other than those previously known, that is to nanoparticles whose surface is functionalized at random by the two lipophilic-hydrophilic compounds. The control of the degree of amphiphilicity is achieved by varying the molar ratio of the two compounds, while their distribution on the surface appears to be random.

The random functionalization of the surface leads to the formation of hydrophilic and lipophilic islands on the same nanoparticle.

If the amount of the hydrophilic compound, for example sodium oleate sulfonate, is sufficient, the sulfonate groups are sufficient to completely stabilize the nanoparticles in water. Such nanoparticles, having a high surface area in contact with water, may be effectively used in the case of small amounts of hydrophobic/lipophilic compounds to be removed.

Conversely, if the amount is not sufficient, the nanoparticles tend to precipitate and to aggregate by contacting the hydrophobic islands and by exposing to water the hydrophilic ones. Aggregates having a size of less than 20 microns are therefore obtained, starting from coated magnetic nanoparticles of a few tens of nanometers according to the present invention.

Thanks to the small size of the nanoparticles according to the present invention, it is possible to obtain the formation of aggregates with a very high active surface area. This particular structure greatly favors the adsorption of large amounts of lipophilic phase (e.g. hydrocarbons) and the surfactant capabilities of the magnetic materials produced. In fact, due to their size, these aggregates respond more easily to a magnetic field and are, therefore, more easily separable from the reaction mixture.

Therefore, a further object of the present invention is an aggregate containing at least one of the above magnetic nanoparticles.

Preferably, said aggregate has a size of less than 25 microns nm, more preferably it is of about 2 microns.

The magnetic nanoparticle according to the invention is therefore stable in water and, at the same time, capable of adsorbing/emulsifying different amounts of hydrophobic/lipophilic compounds that place themselves in the hydrophobic islands of magnetic material. The van der Waals forces which hold together the aggregates are not extremely strong and, when the compounds are adsorbed/emulsified, allow a reorganization of the structure of the material itself.

A further object of the present invention is the use of the above-mentioned magnetic nanoparticles to remove lipophilic or hydrophobic compounds from a solid or liquid environment.

Preferably, said hydrophobic or lipophilic compounds are selected from silicone oils, fluorinated compounds, and hydrocarbons, more preferably they are hydrocarbons.

Examples of use of the magnetic nanoparticles according to the invention are the treatment of waste water contaminated by oil, recovery of bitumen from oil sands (tar sands) or treatment of soils contaminated by lipophilic substances.

Moreover, a further advantage of the nanoparticles according to the present invention is that they can be recycled, that is reused by washing with a suitable solvent, preferably a solvent selected from acetone, tetrahydrofuran, hexane, dioxane, ethanol, ethyl ether, more preferably acetone.

The nanoparticles thus washed may be used again to effectively remove hydrocarbons or any other hydrophobic or lipophilic compound from solid or liquid environments, and this until at least the ninth washing (Experimental part, Example 3, Table 3).

A further object of the present invention is the use of the above magnetic nanoparticles to remove metal ions (cations and anions) dissolved in contaminated waters (waste water).

Preferably, said metals are selected from chromium, iron, zinc, copper, arsenic, and manganese.

Still more preferably, the use of the above magnetic nanoparticles to remove metals dissolved in contaminated water (waste water), preferably including the removal of chromium, iron, zinc, copper, arsenic, and manganese ions, is characterized by the fact that the quantity of particles is in a ratio of 1/10 by weight with respect to the quantity of contaminated water (waste water) to be purified.

Examples of use of the magnetic nanoparticles according to the invention are the treatment of waste water contaminated by metal ions, preferably contaminated by chromium, iron, zinc, copper, arsenic and/or manganese ions.

The carboxylate and sulfate groups present on the surface of the magnetic nanoparticles are chelating groups capable of sequestering ions of several metals from the solutions.

Even when used for the removal of metal ions from contaminated water, the nanoparticles according to the present invention can be advantageously recycled, that is reused by washing with water.

The nanoparticles thus washed may be employed again to effectively remove metal ions from contaminated water.

EXPERIMENTAL PART

Example 1: Formation of Sodium Oleate Sulfonate

In a first Becker, oleic acid (1 eq., 3 mL) is dissolved in 40 mL of tetrahydrofuran under magnetic stirring. In a second Becker, chlorosulfonic acid (1 eq., 0.63 mL) is added dropwise to 40 mL of tetrahydrofuran and dissolution is promoted by magnetic stirring. The solution containing chlorosulfonic acid is added dropwise to the one containing oleic acid. The mixture is allowed to react at room temperature under magnetic stirring. At reaction completion, the solution is concentrated to a third of the initial volume, by evaporation of tetrahydrofuran at 80° C. Sodium bicarbonate (3 eq., 2.5 g) is dissolved in 25 mL of distilled water and this solution is used to basify the reaction product. A saturated solution of sodium chloride is used to separate the reaction product. The reaction product is recovered, filtrated and washed with ethyl ether. After drying in oven, the reaction product is obtained.

Example 2: Co-Precipitation Reaction of Iron Salts to Obtain the Magnetic Nanoparticles A first aqueous solution of ferrous chloride.$4H_2O$ (1 eq., 0.86 g) and ferric chloride.$6H_2O$ (2 eq., 2.35 g) in 40 mL of distilled water is prepared. The salts dissolution is promoted by magnetic stirring and the temperature increased to 80° C. and maintained for half an hour. During the reaction time, an atmosphere of nitrogen is maintained in the reactor.

Sodium oleate sulfonate (0.36 eq., 0.57 g) is dissolved in 5 mL of distilled water at room temperature. A solution of oleic acid (0.36 eq., 0.51 g), ammonia at 28-30% (8 eq., 5.25 mL) and acetone (3 eq., 1 mL) is prepared at room temperature. The solution containing sodium oleate sulfonate is added to this latter solution. The solution containing oleic acid, sodium oleate sulfonate, ammonia and acetone is quickly poured into the solution containing the iron salts. The mixture is maintained under stirring for half an hour. The magnetic nanoparticles are then washed with acetone. The nanoparticles are recovered through the use of a magnet and the washing procedure is repeated three times. The solvent used in the washing removed, and the magnetite nanoparticles are dispersed in water.

Example 3: Use of the Magnetic Nanoparticles for Clarifying Waters Contaminated by Hydrocarbons A sample of water containing 1000 ppm of dispersed hydrocarbons was prepared. Tap water was used as water type, while crude oil from the well of Cascina Cardana (NO) was used as hydrocarbon phase. The emulsion was obtained by using a sonicator.

To estimate the minimum amount of ferromagnetic nanoparticles necessary for the removal of the hydrocarbons dispersed in water under the limit value of 20 ppm, tests were carried out using different amounts of dry particles with respect to the water to be treated. In particular, water samples of 10 mL contaminated with 1000 ppm of hydrocarbons were treated.

The tests were conducted by pouring 10 mL of contaminated water into a vial. The nanoparticles corresponding to a pre-fixed percentage to investigate were added. Following about one minute of manual shacking, the samples were placed on a magnet. After about 10 minutes the nanoparticles that had captured the oil were all attracted by the magnet. The water was removed, and the residual oil was measured.

The measurement of the concentration of the residual oil in water was performed using a calibration line obtained by light-scattering analysis. The concentration limit value detectable through light-scattering is 10 ppm.

TABLE 1

Tests at different % of nanoparticles with respect to the water to be treated.

| Test | Dry nanoparticles % with respect to the total | % of residual hydrocarbons in water |
|---|---|---|
| 1 | 0.75 | <10 ppm |
| 2 | 0.5 | <10 ppm |
| 3 | 0.4 | <10 ppm |
| 4 | 0.2 | 14 ppm |
| 5 | 0.1 | 35 ppm |
| 6 | 0.05 | 105 ppm |

Following these tests, the minimum amounts of nanoparticles required for the removal of the hydrocarbons dispersed in water under the limit value of 20 ppm was identified. This value is equal to 0.1% of dry ferromagnetic nanoparticles with respect to the total of water to be treated. To confirm this value, the tests were repeated 5 times.

TABLE 2

Tests with 0.2% of dry nanoparticles with respect to the total water to be treated.

| Test | Dry nanoparticles % with respect to the total | % of residual hydrocarbons in water |
|---|---|---|
| 1 | 0.2 | <10 ppm |
| 2 | 0.2 | 12 ppm |
| 3 | 0.2 | 15 ppm |
| 4 | 0.2 | <10 ppm |
| 5 | 0.2 | <10 ppm |

The next step was to investigate the possible recycling of the exhausted nanoparticles after washing with solvent to remove the captured hydrocarbon phase. Acetone, which is the same solvent used for cleaning the nanoparticles during the synthesis step, was chosen as the solvent used for washing. The tests were conducted by treating 200 mL of water containing 1000 ppm of oil from the well in Cascina Cardana (200 mL were in fact only for the first cycle, then it was calculated the amount of water that it was possible to treat with the nanoparticles recovered, while maintaining the percentage of the dry nanoparticles at 0.2% based on the total to be treated).

The experimental procedure involves the recovery of the exhausted ferromagnetic nanoparticles through the use of a magnet; such nanoparticles are then treated with acetone in an amount equal to one quarter of the treated water, under stirring with a mechanical arm for about an hour. The nanoparticles recovered through the use of a magnet were weighed to calculate the recovery yield, and then re-dispersed in water. These nanoparticles were then used for a subsequent washing. The acetone used in the washing is instead placed in an oven at 50° C., and evaporated to calculate the percentage of oil effectively captured by the nanoparticles. In parallel, a sample of oil from the well in Cascina Cardana was placed in an oven to verify that, at that temperature, there were no volatile compounds which would invalidate the measurement.

TABLE 3

Tests of re-use of the nanoparticles.

| Use | % of residual oil in water | % of recovered nanoparticles | % of recovered oil |
|---|---|---|---|
| First | <10 ppm | 92% | 96% |
| Second | <10 ppm | 94% | 93% |
| Third | 12 ppm | 94% | 97% |
| Fourth | <10 ppm | 92% | 94% |
| Fifth | <10 ppm | 91% | 93% |
| Sixth | 13 ppm | 96% | 94% |
| Seventh | <10 ppm | 95% | 93% |
| Eight | 14 ppm | 96% | 97% |
| Ninth | <10 ppm | 97% | 96% |
| Tenth | 11 ppm | 95% | 95% |

Following these tests, and taking into account the losses due to the experimental procedure, it can be said that the ferromagnetic particles are reusable with the same efficiency as the newly synthesized nanoparticles, at least up to the ninth reuse.

The efficacy of the ferromagnetic nanoparticles in clarifying water with larger amounts of hydrocarbons dispersed was tested. As in the previous tests, the water used was tap water, while the crude oil coming from the well of Cascina Cardana (NO) was the hydrocarbon phase. The emulsion was obtained by using a sonicator. In these tests the amount of emulsified oil is equal to 2000 ppm. The tests were conducted on samples of 10 mL with the method described for previous experiments.

TABLE 4

Efficacy of the nanoparticles on waters contaminated with 2000 ppm.

| Test | Dry nanoparticles % with respect to the total | % of residual hydrocarbons in water |
|---|---|---|
| 1 | 0.2 | 16 ppm |
| 2 | 0.2 | <10 ppm |
| 3 | 0.2 | 15 ppm |
| 4 | 0.2 | 13 ppm |
| 5 | 0.2 | <10 ppm |

The efficacy of the nanoparticles in clarifying contaminated water was also confirmed on samples of water containing a higher amount of dispersed hydrocarbons.

Example 4: Use of the Nanoparticles for the Recovery of Oil from Oil Sands (Tar Sands)

Given the high capacity of the ferromagnetic nanoparticles to capture hydrocarbons, their capacity to recover oil extracted from tar sands was tested. A method used for their extraction involves the use of a solvent (for example, kerosene) and water at a basic pH (10-14) at a temperature of 80° C.

In this process, the magnetic nanoparticles application was performed using three different methods:

1—Classic extraction process and application of the nanoparticles at the end of the process to recover the oil extracted.

2—Extraction process that involves the use of kerosene and nanoparticles dispersed in water at pH of synthesis (pH=7).

3—Extraction process that involves the use of kerosene and nanoparticles dispersed in water at pH=14.

1. Application of the Nanoparticles after Classic Extraction.

Figure 1:
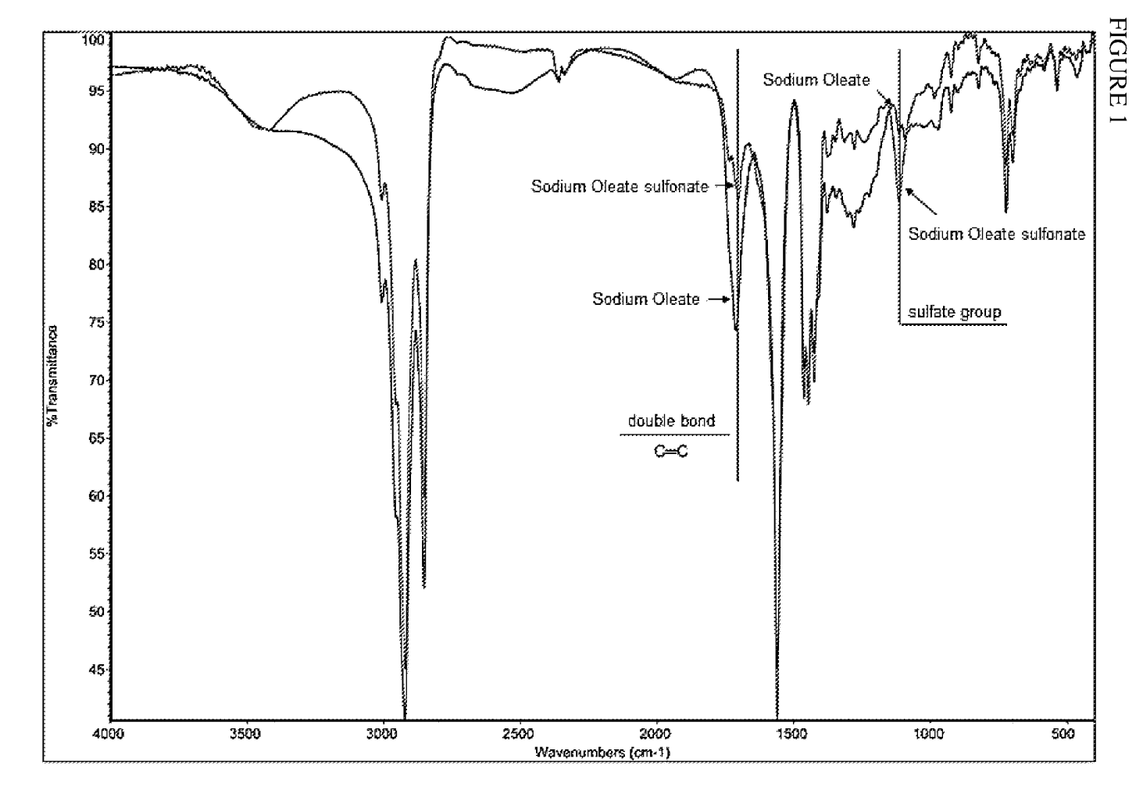
FIG. 1: FT-IR spectra of sodium oleate and sodium oleate sulfonate
Figure 2:
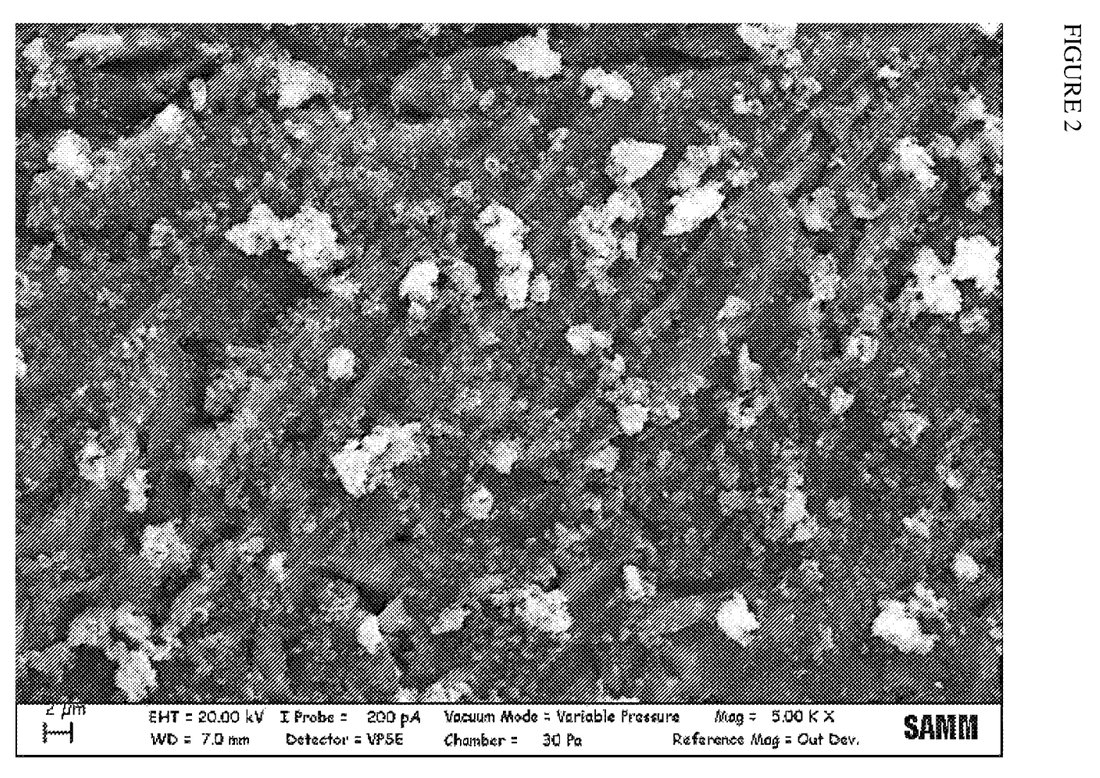
FIG. 2: Photographs of the magnetic nanoparticles of the invention taken by a scanning electron microscope (SEM) at different magnifications (5 k×, 15 k×, 20 k×)
Figure 3:
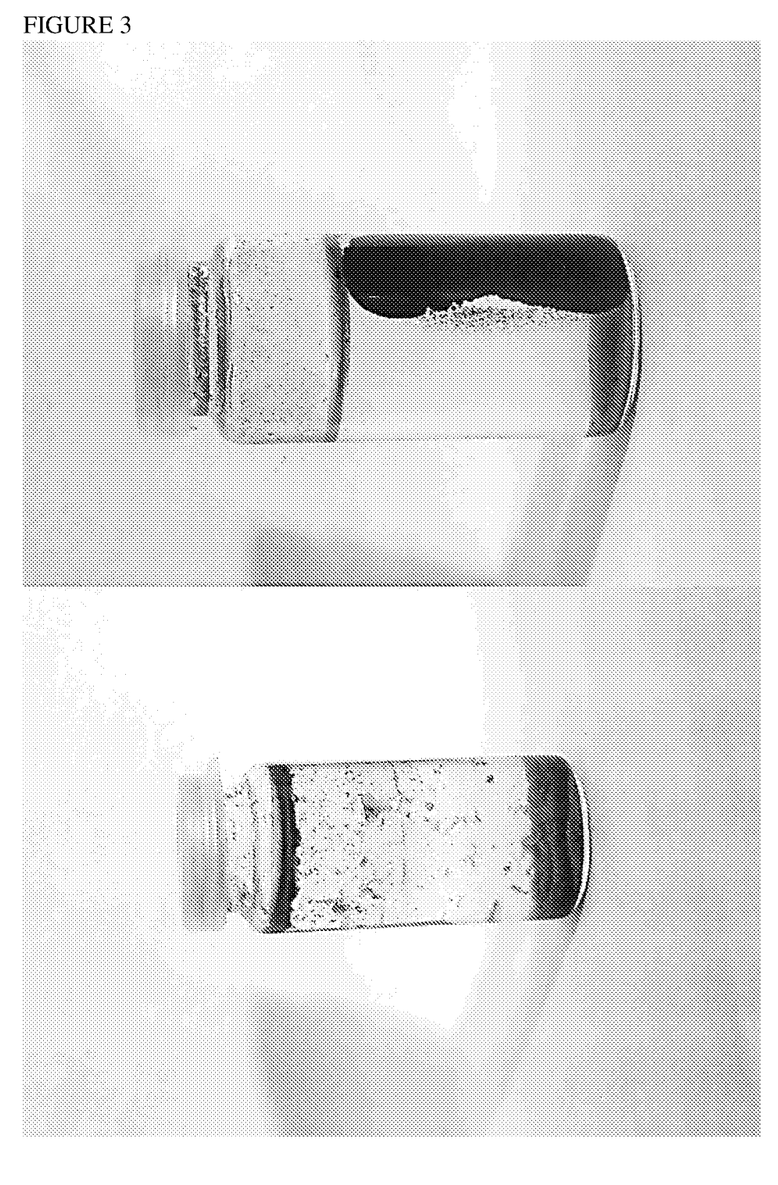
FIG. 3: Photographs portraying a sample after a classic extraction process, on the left, and a sample after the use of magnetic nanoparticles of the invention, on the right

One gram of tar sands containing about 13% by weight of oil was weighed. The amount of kerosene used is equal to twice the oil content, 0.36 g. Tar sands and kerosene were placed in a vial and put under gentle magnetic stirring to favor a first oil extraction. Subsequently, 25 mL of water at pH 14 were added, the system was brought to 80° C. and allowed to react for 8 hours. At the end of the process, there were obtained an oily upper phase corresponding to the oil extracted, an aqueous phase with dispersed oil, and the cleaned grey sand on the bottom. The magnetic nanoparticles were added to this system. The amount of dry nanoparticles is equal to 3.5 times the weight of the bitumen present in the tar sands plus the kerosene used, that is 0.49 g of dry nanoparticles in aqueous solution at 2.5%. The system was manually shacked, and then a magnet was used to attract the nanoparticles that had captured the oil extracted. A shown in FIG. 3, the picture on the left shows the sample after extraction, while on the right the sample after the addition of magnetic nanoparticles and the use of the magnet to isolate them.

In order to calculate the extraction yield, the sample was placed in a muffle at 500° C. to remove water, kerosene and the bitumen extracted. From the difference in weight at the end of the test, an extraction yield of 94% was calculated.

2. Application of the Nanoparticles during the Extraction Phase at pH of Synthesis.

Figure 4:
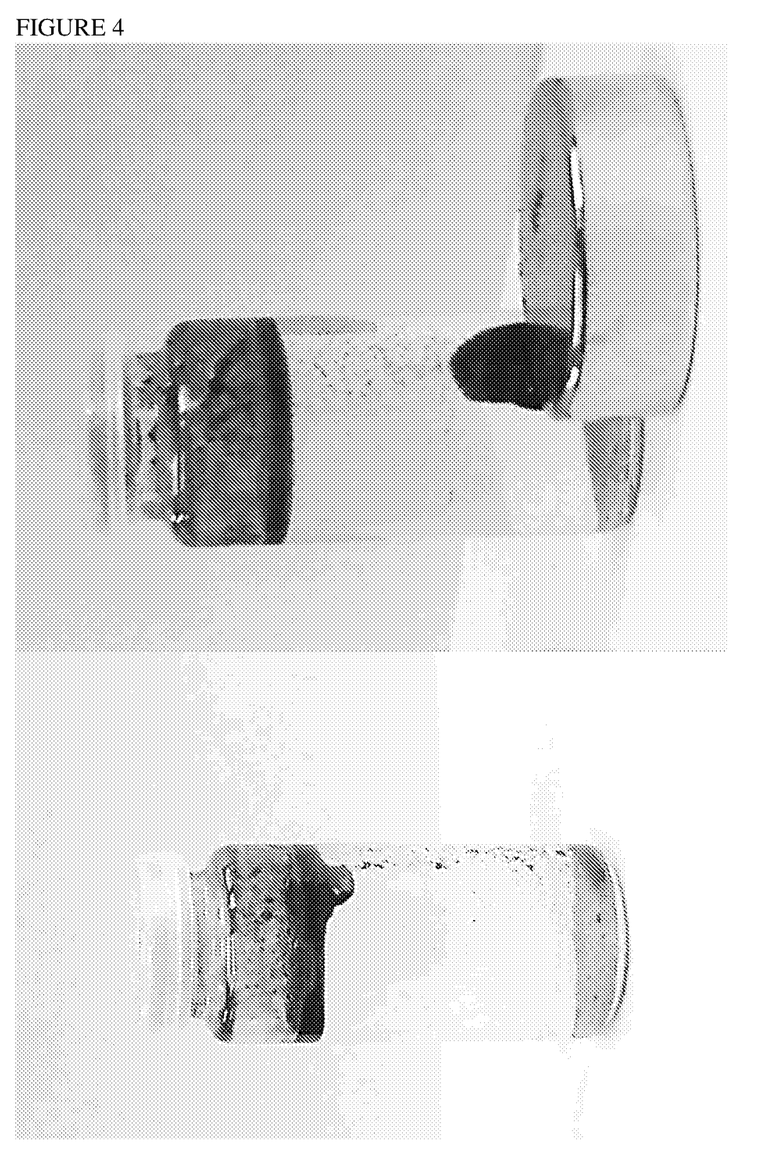
FIG. 4: Photographs portraying a sample after an extraction process, on the left, and a sample after the use of magnetic nanoparticles of the invention, on the right
Figure 5:
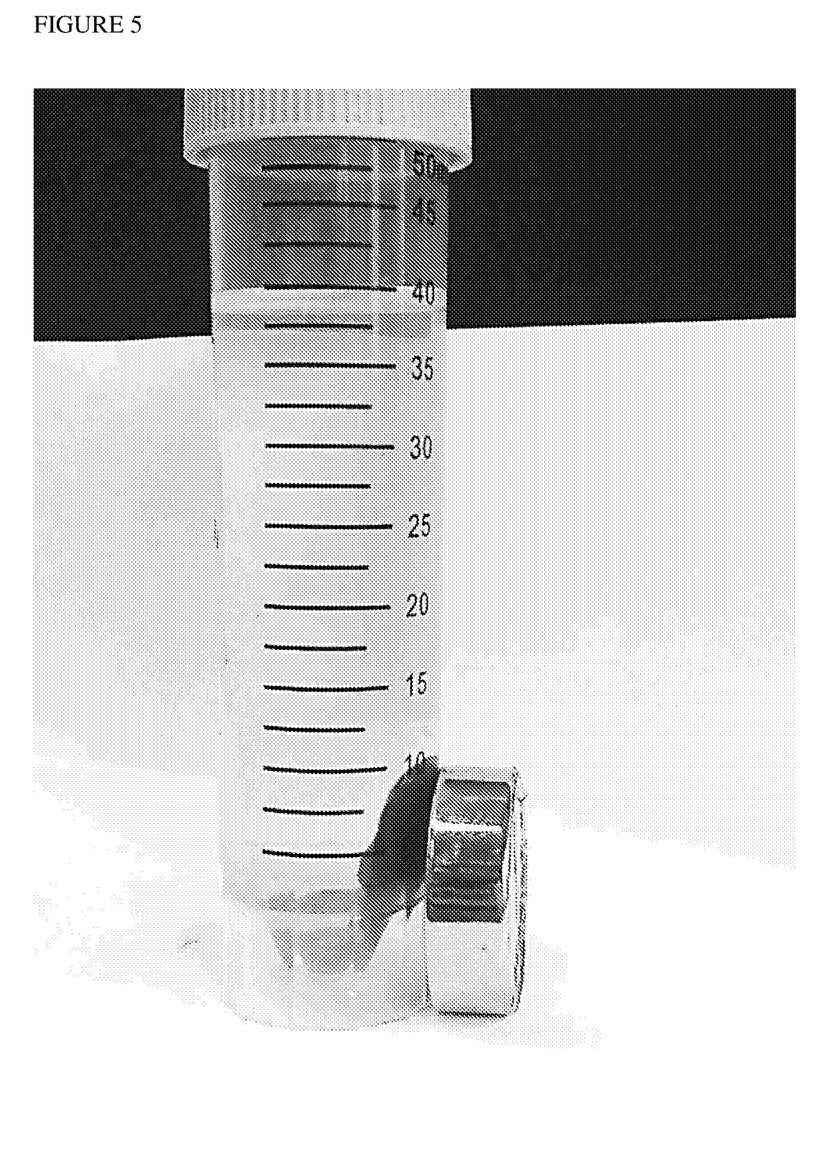
FIG. 5: Photograph portraying a sample after an extraction process

The amounts used for this test are the same as the previous one: one gram of tar sands, 0.36 g of kerosene. To these substances, weighed and place under stirring, 0.49 g of dry nanoparticles in aqueous solution at 2.5% were added. The system was brought to a temperature of 80° C. and allowed to react for 8 hours. In FIG. 4, the sample after the extraction procedure is shown on the left, while on the right the effect of the application of a magnetic field is shown. The extracted oily phase is easily mobilizable using a magnet.

From the test in a muffle, an extraction yield of 97% was recorded.

3. Application of the Nanoparticles during the Extraction Phase at pH 14.

The experimental procedure is the same as described above. In this case, however, the aqueous solution containing the nanoparticles was brought to pH=14 using NaOH. For this procedure an extraction yield of 95% was recorded.

Example 5: Use of the Nanoparticles for the Treatment of Water Contaminated by Metal Ions A sample of water contaminated by electroplating was treated with an aqueous solution of magnetic nanoparticles at 9.5% by weight. In total, 400 mL of contaminated water were treated, divided into single batches of 50 mL each with 15 mL aqueous solution of magnetic nanoparticles.

The experimental procedure involves injecting the solution of magnetic nanoparticles into the batch containing the contaminated water. The sample was then stirred for 30 minutes using a vortex. In the current state of the work the mixing time is not an optimized parameter; 30 minutes correspond to a time chosen arbitrarily.

The sample was then placed on a magnet overnight to separate the magnetic nanoparticles and obtain purified water.

As a verification tool of the effective removal of metals from the water treated, a series of standard tests according to EPA (EPA 6020A 2007) and POM (POM 545 Rev. 1 2013) methods were performed. The results obtained are shown in Table 5 below.

TABLE 5

Effectiveness of nanoparticles on waters contaminated by metal ions.

| METAL | UoM | PRE-treatment | POST-treatment | DLgs 152/06 All 5 Tab 2 | Method |
|---|---|---|---|---|---|
| Arsenic | μg/L | 66.9 | 2.4 | 10 | EPA[1] |
| Manganese | μg/L | 927 | 22.4 | 50 | EPA[1] |
| Iron | μg/L | 4216 | 36 | 200 | EPA[1] |
| Iron (II) | μg/L | 48 | <10 | | POM[2] |
| Iron (III) | μg/L | 4168 | 36 | | EPA[1] + POM[2] |

EPA[1]: EPA 6020A 2007
POM[2]: POM 545 Rev. 1 2013

The invention claimed is:

1. Magnetic nanoparticle comprising:
   a core containing a ferromagnetic material, wherein the core has a surface that is functionalized with an outer coating comprising
   at least one lipophilic compound and at least one hydrophilic compound, each of which is covalently bonded to the surface and randomly distributed on it to form, respectively, lipophilic and hydrophilic islands wherein said at least one lipophilic compound and said at least one hydrophilic compound are present in the outer coating in a molar ratio comprised between 1:0.1 and 1:10.

2. Nanoparticle according to claim 1, wherein said ferromagnetic material is selected from magnetite, maghemite, barium ferrite, cobalt ferrite, nickel ferrite, manganese ferrite, strontium ferrite, or zinc ferrite.

3. Nanoparticle according to claim 1, wherein said at least one lipophilic compound is selected from palmitoleic acid, oleic acid, erucic acid, linoleic acid, linolenic acid, arachidonic acid, and ricinoleic acid.

4. Nanoparticle according to claim 1, wherein said at least one lipophilic compound and said at least one hydrophilic compound are present in the outer coating in a molar ratio comprised between 1:0.8 and 1:1.5.

5. Nanoparticle according to claim 4, wherein said at least one lipophilic compound and said at least one hydrophilic compound are present in the outer coating in a molar ratio of about 1:1.

6. Nanoparticle according to claim 1, wherein said at least one hydrophilic compound is selected from a hydrophilic carboxylic acid or an alkaline or alkaline earth salt of a fatty acid containing a sulfonate group.

7. Nanoparticle according to claim 6, wherein said hydrophilic carboxylic acid is selected from methacrylic acid or a polymer thereof, acrylic acid or a polymer thereof, citric acid, adipic acid, malic acid, ascorbic acid, oxalic acid, malonic acid, succinic acid and fumaric acid.

8. Nanoparticle according to claim 6, wherein said alkaline salt of a fatty acid containing a sulfonate group is selected from a sodium or potassium salt of sulfonated palmitoleic acid, sulfonated oleic acid, sulfonated erucic acid, sulfonated linoleic acid, sulfonated linolenic acid, sulfonated arachidonic acid, and sulfonated ricinoleic acid.

9. Nanoparticle according to claim 6, wherein said alkaline earth salt of a fatty acid containing a sulfonate group is selected from a calcium or magnesium salt of sulfonated palmitoleic acid, sulfonated oleic acid, sulfonated erucic acid, sulfonated linoleic acid, sulfonated linolenic acid, sulfonated arachidonic acid, and sulfonated ricinoleic acid.

10. Aggregate containing nanoparticles according to claim 1, having a particle size of less than 25 micron.

11. Process for preparing a magnetic nanoparticle, comprising the co-precipitation of an aqueous solution of Iron (II) and Iron (III) salts and a solution containing a lipophilic and a hydrophilic compound, wherein said lipophilic compound and said hydrophilic compound are present in said solution in a molar ratio comprised between 1:0.1 and 1:10, wherein said magnetic nanoparticle comprises: a core containing a ferromagnetic material, wherein the core has a surface that is functionalized with an outer coating comprising at least one lipophilic compound and at least one hydrophilic compound, each of which is covalently bonded to the surface and randomly distributed on it to form, respectively, lipophilic and hydrophilic islands.

12. Process according to claim 11, wherein said lipophilic compound is selected from palmitoleic acid, oleic acid, erucic acid, linoleic acid, linolenic acid, arachidonic acid, and ricinoleic acid.

13. Process according to claim 11, wherein said hydrophilic compound is selected from a hydrophilic carboxylic acid or an alkaline or alkaline earth salt of a fatty acid containing a sulfonate group.

14. Process according to claim 13, wherein said hydrophilic carboxylic acid is selected from methacrylic acid or a polymer thereof, acrylic acid or a polymer thereof, citric acid, adipic acid, malic acid, ascorbic acid, oxalic acid, malonic acid, succinic acid, and fumaric acid.

15. Process according to claim 13, wherein said alkaline salt of a fatty acid containing a sulfonate group is selected from a sodium or potassium salt of sulfonated palmitoleic acid, sulfonated oleic acid, sulfonated erucic acid, sulfonated linoleic acid, sulfonated linolenic acid, sulfonated arachidonic acid, and sulfonated ricinoleic acid.

16. Process according to claim 13, wherein said alkaline earth salt of a fatty acid containing a sulfonate group is selected from a calcium or magnesium salt of sulfonated palmitoleic acid, sulfonated oleic acid, sulfonated erucic acid, sulfonated linoleic acid, sulfonated linolenic acid, sulfonated arachidonic acid, and sulfonated ricinoleic acid.

17. Process according to claim 11, wherein said lipophilic compound and said hydrophilic compound are preset in said solution in a molar ratio comprised between 1:0.8 and 1:1.5.

18. Process according to claim 11, wherein said co-precipitation takes place in a basic environment.

19. Method of removing hydrophobic or lipophilic compounds from solid or liquid environment with a nanoparticle according to claim 1, said method comprising
    dispersing said nanoparticle in said solid or liquid environment, said nanoparticle being capable of adsorbing hydrophobic or lipophilic compounds;
    thereby removing said hydrophobic or lipophilic compounds from said solid or liquid environment.

20. Method according to claim 19, wherein said hydrophobic or lipophilic compounds are selected from silicone oils, fluorinated compounds, and hydrocarbons.

21. Method of removing metals dissolved in contaminated water with a nanoparticle according to claim 1, said method comprising:
    dispersing said nanoparticle in said contaminated water, said nanoparticle being capable of adsorbing metals;
    thereby removing said metals from said contaminated water.

22. Method according to claim 21, wherein said metals are selected from chromium, iron, zinc, copper, arsenic and manganese.

23. Method according to claim 21 wherein said particles with respect to the contaminated water to be purified are present in a 1/10 ratio by weight.

* * * * *